US008816675B2

(12) United States Patent
Kinashi

(10) Patent No.: US 8,816,675 B2
(45) Date of Patent: Aug. 26, 2014

(54) VARIABLE RELUCTANCE RESOLVER HAVING CORRELATION BETWEEN A LIMITED NUMBER OF STATOR SLOTS AND A NUMBER OF ROTOR CONVEX POSITIONS

(75) Inventor: Yoshikazu Kinashi, Sisou (JP)

(73) Assignee: Ichinomiya Denki Co., Ltd., Hyogo (JP)

( * ) Notice: Subject to any disclaimer, the term of this patent is extended or adjusted under 35 U.S.C. 154(b) by 142 days.

(21) Appl. No.: 13/444,253

(22) Filed: Apr. 11, 2012

(65) Prior Publication Data

US 2012/0262161 A1 Oct. 18, 2012

(30) Foreign Application Priority Data

Apr. 15, 2011 (JP) ................................ 2011-090563

(51) Int. Cl.
*G01B 7/30* (2006.01)
*H02K 24/00* (2006.01)
*H02K 3/28* (2006.01)

(52) U.S. Cl.
CPC . *H02K 24/00* (2013.01); *H02K 3/28* (2013.01)
USPC .................................. 324/207.17; 324/207.25

(58) Field of Classification Search
USPC ........... 324/173–175, 207.15–207.18, 207.25
See application file for complete search history.

(56) References Cited

U.S. PATENT DOCUMENTS

| 3,041,486 | A | * | 6/1962 | Moffitt | 310/168 |
| 7,030,607 | B2 | * | 4/2006 | Ando et al. | 324/207.25 |
| 7,868,504 | B2 | * | 1/2011 | Kataoka et al. | 310/168 |
| 2004/0070389 | A1 | * | 4/2004 | Kobayashi | 324/207.17 |
| 2005/0279180 | A1 | * | 12/2005 | Aokii et al. | 73/862.325 |
| 2006/0232270 | A1 | * | 10/2006 | Ijima | 324/207.17 |
| 2008/0258585 | A1 | * | 10/2008 | Kataoka et al. | 310/68 B |
| 2009/0179529 | A1 | * | 7/2009 | Makino et al. | 310/68 B |
| 2013/0088127 | A1 | * | 4/2013 | Ogawa et al. | 310/68 B |

FOREIGN PATENT DOCUMENTS

JP 2001-143010 5/2001

* cited by examiner

*Primary Examiner* — Jay Patidar
(74) *Attorney, Agent, or Firm* — Jordan and Hamburg LLP

(57) ABSTRACT

A VR resolver comprises a resolver stator and a resolver rotor. Teeth whose number is equal to the product of an integer P of 2 or more and 4 are arranged in an annular shape from the inner circumferential side to the inner side in the diameter direction of the resolver stator. In the resolver rotor, convex portions whose number is equal to the product of an odd number m of 3 or more and the integer P are radially projected. All the stator slots are provided with excitation coils which generate a magnetic field by the application of a voltage. Moreover, all the stator slots are provided with either a first coil or a second coil which outputs electric signals of different waveforms based on the magnetic field.

5 Claims, 8 Drawing Sheets

US 8,816,675 B2

VARIABLE RELUCTANCE RESOLVER HAVING CORRELATION BETWEEN A LIMITED NUMBER OF STATOR SLOTS AND A NUMBER OF ROTOR CONVEX POSITIONS

BACKGROUND OF THE INVENTION

The present invention relates to a variable reluctance resolver of a single-phase input and two-phase output type.

Heretofore, a rotation angle sensor which detects the rotation angle is known. The rotation angle sensor is widely used. For example, the rotation angle sensor is used for a wheel speed sensor, a handle rudder angle sensor, and the like in a power system of automobiles. The rotation angle sensor is also used for index tables of rotary drive units of robots, carrying apparatuses, and the like, automatic assembly machines, measurement machines, and the like, processing indexes of NC machine tools, specialized machines, and the like, for example. The rotation angle sensor used in a severe environment requires high environment resistance. For example, optical encoders or magnetic encoders which have been used heretofore for the rotation angle sensor are vulnerable to the influence of temperature changes and electromagnetic fields and have low environment resistance. A resolver is mentioned as the rotation angle sensor which realizes high environment resistance. Known as one of the resolvers is a variable reluctance resolver (hereinafter referred to as a VR resolver).

The VR resolver detects a rotation angle utilizing changes in magnetic resistance (reluctance) with the rotation of a resolver rotor. In a common VR resolver, an annular resolver stator has excitation windings and output windings which are wound in the shape of a coil. The excitation windings generate a magnetic field by the application of a voltage. The output windings output electric signals based on the magnetic field. Inside the resolver stator, a resolver rotor is disposed. The magnetic resistance in a magnetic path changes with the rotation of the resolver rotor. The electric signals output from the output winding change with the changes in the magnetic resistance. For example, by signal processing of the electric signals output from output coils by an external signal-processing circuit, the rotation speed or the rotation angle of the resolver rotor is calculated.

Various kinds of VR resolvers are referred to as "nX" for distinguishing them. "n" refers to the number of cycles of sine waves of a voltage output during one rotation of the resolver rotor in the output signal of VR resolver and is referred to as a shaft-multiple angle number n. For example, the VR resolver in which a 2-cycle sine wave is output during one rotation of the resolver rotor is referred o as "2X". The shaft-multiple angle number n is determined by the shape of the resolver rotor. In general, when the number of slots of the resolver stator is defined as N, the VR resolver is constituted so that N=4n is established. For example, Patent Document 1 discloses a VR resolver having a 2X resolver rotor and a 8 slot resolver stator.

In the VR resolver, "nX" is increased for the purpose of detecting a rotation angle with high precision. According to the relationship of N=4n, in order to increase the "nX", the number of stator slots needs to be increased. When the number of the stator slots is increased, a problem of an increase in the size of the VR resolver or an increase in cost arises.

As a method for increasing "nX" when the number of stator slots is in a fixed range (lower than 4n pieces), a configuration is known in which three coils (e.g., an excitation coil, a first-phase output coil, and a second-phase output coil) are provided from the inner circumferential surface to the outer circumferential surface of the stator slots. However, the outer diameter of the coils is different depending on the order of the layer around which the two output coils are wound. The phase or the impedance of the two output coils becomes unbalanced due to the difference in the outer diameter of the coils, and, as a result, an electrical error becomes large. The increase in the electrical error reduces the detection accuracy of the rotation angle. As an increase in the use of the VR resolver, high detection accuracy is required. Therefore, a small VR resolver in which the cost is low and the electrical error is small is desired.

The present invention has been made in view of the above-described circumstances. It is an object of the invention to provide a VR resolver capable of detecting a rotation angle with high precision with a limited number of stator slots.

CROSS REFERENCE TO RELATED APPLICATIONS

JP2001-143010

SUMMARY OF THE INVENTION

The present invention is a variable reluctance resolver of a single-phase input and two-phase output type. The invention has an annular stator in which stator slots whose number is equal to the product of an integer P of 2 or more and 4 are formed at regular intervals along the circumferential direction, excitation coils which are provided in all the stator slots and generate a magnetic field by the application of a voltage, first output coils which are selectively provided in the stator slots and output an electric signal of a first waveform based on the magnetic field, second output coils which are provided in the stator slots in which the first output coils are not provided among the stator slots and output an electric signal of a second waveform based on the magnetic field, and a rotor in which convex portions whose number is equal to the product of an odd number m of 3 or more and the integer P are provided along the circumferential direction and which rotates inside the stator.

According to the VR resolver of the invention, a rotation angle can be detected with high precision with a limited number of stator slots.

DETAILED DESCRIPTION OF THE PREFERRED EMBODIMENTS

Figure 1:
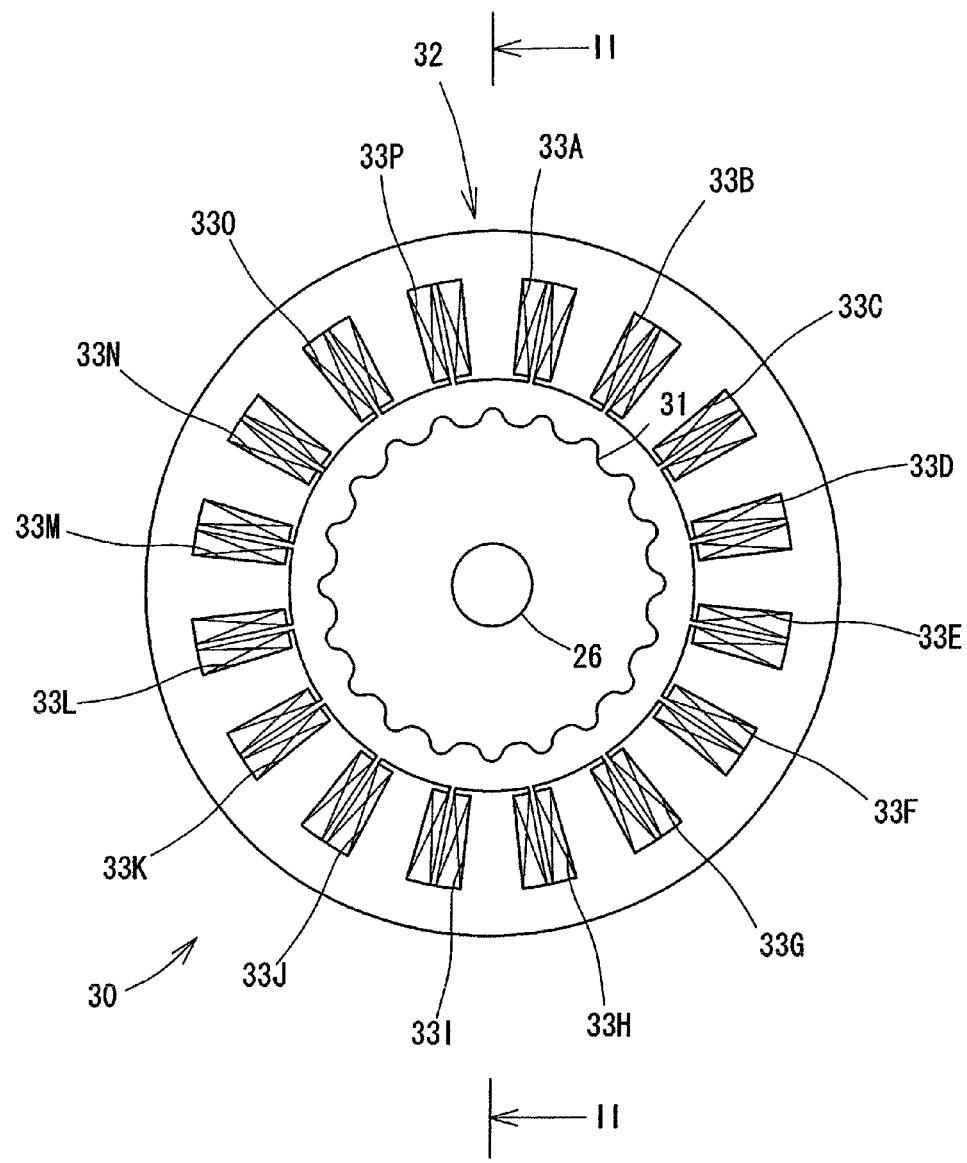
FIG. 1 is a schematic view illustrating the configuration of a VR resolver 30 according to a first embodiment.

Hereinafter, preferable embodiments of the invention are described referring to the drawings as appropriate. It is a matter of course that the embodiments described below are merely examples of the invention and the embodiments of the invention can be altered as appropriate insofar as the scope of the invention is not altered.

First Embodiment

Figure 2:
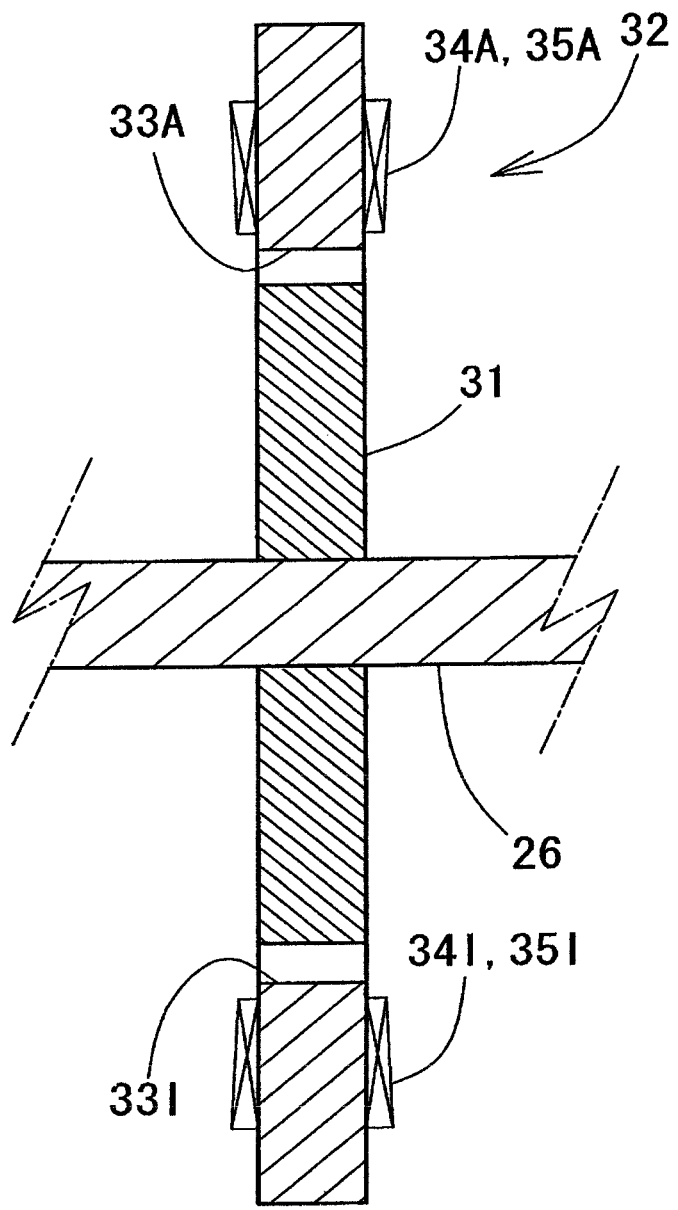
FIG. 2 is a cross sectional view along the cutting plane line II-II of FIG. 1.

As illustrated in FIGS. 1 and 2, a VR resolver 30 is constituted by a resolver stator 32 and a resolver rotor 31. For example, in an aspect in which the VR resolver 30 is mounted on a rotary drive unit or the like, the resolver rotor 31 is fixed to the shaft 26 of the rotary drive unit. The resolver rotor 31 is rotated to the resolver stator 32 while being integrated with the shaft 26.

As illustrated in FIG. 1, the resolver stator 32 has an approximately cylindrical shape. 16 teeth 33A to 33P are projected from the inner circumferential surface to the inner side in the diameter direction of the resolver stator 32. The 16 teeth 33A to 33P are arranged in an annular shape. Spaces formed by the adjacent teeth 33A to 33P at the inner circumferential surface of the resolver stator 32 are stator slots. The resolver stator 32 is obtained by press processing of a nondirectional electrical steel plate of a given thickness into a shape as viewed in plane illustrated in FIG. 1, and laminating a plurality of the steel plates and fixing the same by crimping or the like. The resolver rotor 31 is disposed inside the teeth 33A to 33P of the resolver stator 32. The resolver rotor 31 is obtained by laminating a plurality of nondirectional electrical steel plates having a shape in which 20 convex portions are radially projected as viewed in plan, and fixing the same by crimping or the like. The gap permeance of the resolver rotor 31 and the resolver stator 32 changes in the shape of a sine wave to the angle θ of the rotation angle of the resolver rotor 31. The shaft-multiple angle number n is equal to the number of the convex portions formed in the resolver rotor 31. In the resolver rotor 31 in this embodiment, the angle θ required for 1 cycle of a sine wave is 360/20=18°. More specifically, the resolver is a "20X" type in which when the resolver rotor 31 makes one rotation, a 20 cycle sine wave is output.

The number of the teeth is determined by the product of an integer P of 2 or more and 4. The number of the convex portions of the resolver rotor is determined by the product of an odd number m of 3 or more and the integer P. This embodiment describes an example of P=4 and m=5. For the integer P and the odd number m, different values may be used. For example, in the case of m=3, the number of the convex portions of the resolver rotor 31 is 12. Preferably, the range of the values of the integer P is 2 to 6 and the value of the odd number m is 3 or 5.

Figure 3:
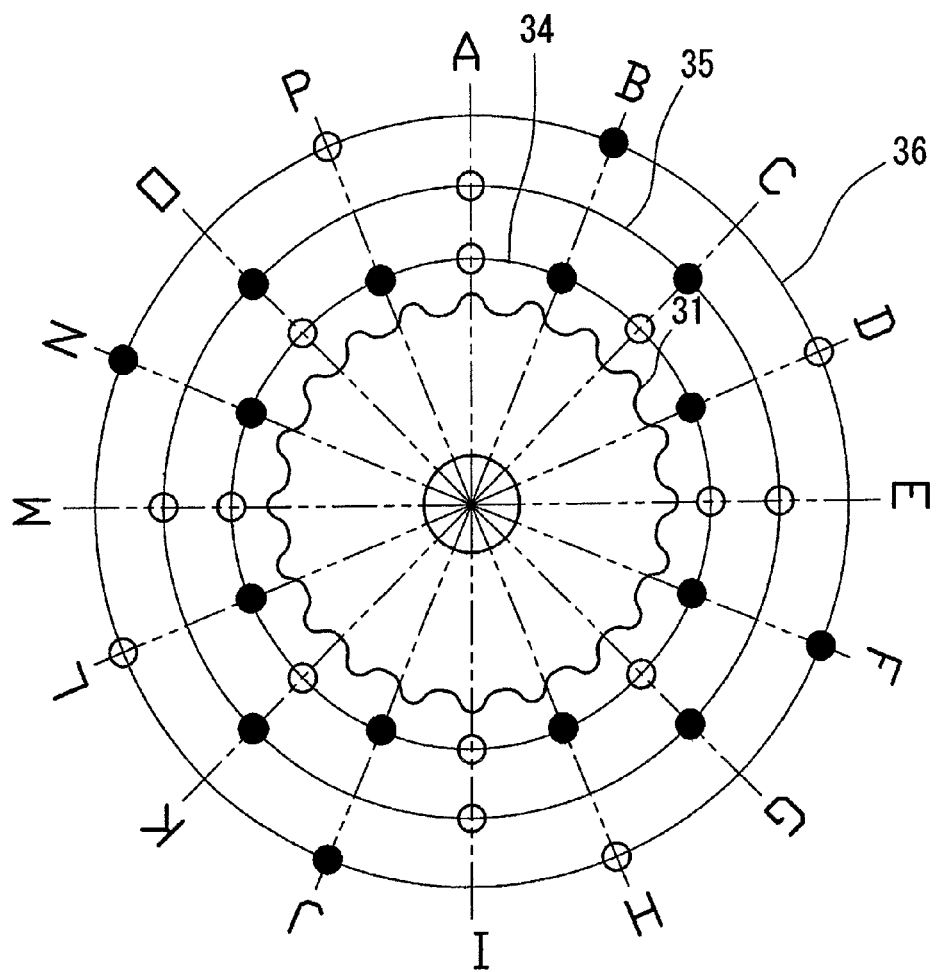
FIG. 3 is a schematic view illustrating a coil in a resolver stator 32.

In FIG. 3, the position of each of the teeth 33A to 33P of the resolver stator 32 is illustrated only by alphabets A to P. Excitation coils 34A to 34P are illustrated on the line illustrating the innermost circle. First coils 35A, 35C, 35E, 35G, 35I, 35K, 35M, and 35O are illustrated on the line illustrating the center circle. Second coils 36B, 36D, 36F, 36H, 36J, 36L, 36N, and 36P are illustrated on the line illustrating the outermost circle. As illustrated in FIG. 3, around the teeth 33A to 33P of the resolver stator 32, the excitation coils 34A to 34P, the first coils 35A, 35C, 35E, 35G, 35I, 35K, 35M, and 35O, and the second coils 36B, 36D, 36F, 36H, 36J, 36L, 36N, and 36P are wound in a given winding direction. The number of turns of each of the first coils 35A, 35C, 35E, 35G, 35I, 35K, 35M, and 35O is almost the same and the number of turns of each of the second coil 36B, 36D, 36F, 36H, 36J, 36L, 36N, and 36P is almost the same.

For the winding of the excitation coils 34A to 34P, the first coils 35A, 35C, 35E, 35G, 35I, 35K, 35M, and 35O, and the second coils 36B, 36D, 36F, 36H, 36J, 36L, 36N, and 36P, a flyer type winder or a nozzle type winder is used, for example.

The excitation coils 34A to 34P are wound around the teeth 33A to 33P, respectively. When a current is applied to the excitation coils 34A to 34P, a magnetic field of positive polarity or negative polarity is formed in each of the excitation coils 34A to 34P. Since an alternating current is applied to the excitation coils 34A to 34P, the polarity in each of the excitation coils 34A to 34P changes at a given frequency. Around the teeth 33A, 33C, 33E, 33G, 33I, 33K, 33M, and 33O, the excitation coils of positive polarity 34A, 34C, 34E, 34G, 34I, 34K, 34M, and 34O are wound, respectively. Around the teeth 33B, 33D, 33F, 33H, 33J, 33L, 33N, and 33P, the excitation coils of negative polarity 34B, 34D, 34F, 34H, 34J, 34L, 34N, and 34P are wound, respectively. In FIG. 3, although the coil which becomes positive polarity is illustrated by "○" and the coil which becomes negative polarity is illustrated by "●", it is in a relative relationship whether the polarity is positive or negative. Therefore, it is a matter of course that the polarity may be reversed. Thus, when the excitation coils 34A, 34C, 34E, 34G, 34I, 34K, 34M, and 34O excite either positive polarity or negative polarity, the excitation coils 34B, 34D, 34F, 34H, 34J, 34L, 34N, and 34P excite the other one of positive polarity or negative polarity.

The excitation coils 34A to 34R are disposed facing each other in such a manner as to form one pair at a rotation angle of 180° to the rotation center of the resolver rotor 31. In these excitation coils 34A to 34R, the polarity of a pair of the coils disposed facing each other is the same.

The first coils 35A, 35C, 35E, 35G, 35I, 35K, 35M, and 35O are wound around the teeth 33A, 33C, 33E, 33G, 33I, 33K, 33M, and 33O, respectively. In response to the magnetic field of the excitation coils 34A to 34P, an induced voltage arises in each of the first coils 35A, 35C, 35E, 35G, 35I, 35K, 35M, and 35O. Around the teeth 33A, 33E, 33I, and 33M, the first coils 35A, 35E, 35I, and 35M are wound with positive polarity, respectively. Around the teeth 33C, 33G, 33K, and 33O, the first coils 35C, 35G, 35K, and 35O are wound with negative polarity, respectively. Thus, the polarity of the first coils 35C, 35G, 35K, and 35O becomes the same as the polarity excited by the excitation coils 34C, 34G, 34K, and 34O which the first coils face, respectively. The polarity of the first coils 35A, 35E, 35I, and 35M becomes opposite to the polarity excited by the excitation coils 34A, 34E, 34I, and 34M which the first coils face, respectively.

The first coils 35A, 35C, 35E, 35G, 35I, 35K, 35M, and 35O are disposed facing each other in such a manner as to form one pair at a rotation angle of 180° to the rotation center of the resolver rotor 31. The polarity of each pair of the first coils 35A, 35C, 35E, 35G, 35I, 35K, 35M, and 35O is the same as the polarity of the excitation coils 34A, 34C, 34E, 34G, 34I, 34K, 34M, and 34O which the first coils face, respectively.

The second coils 36B, 36D, 36F, 36H, 36J, 36L, 36N, and 36P are wound around the teeth 33B, 33D, 33F, 33H, 33J, 33L, 33N, and 33P, respectively. In response to the magnetic field of the excitation coils 34A to 34R, an induced voltage arises in each of the second coils 36B, 36D, 36F, 36H, 36J, 36L, 36N, and 36P. Around the teeth 33D, 33H, 33L, and 33P, the second coils 36D, 36H, 36L, and 36P are wound with positive polarity, respectively. Around the teeth 33B, 33F, 33J, and 33N, the second coils 36B, 36F, 36J, and 36N are wound with negative polarity, respectively. Thus, the polarity of the second coils 36D, 36H, 36L, and 36P becomes the same as the polarity excited by the excitation coils 34D, 34H, 34L, and 34P which the second coils face, respectively. The polarity of the second coils 36B, 36F, 36J, and 36N becomes opposite to the polarity excited by the excitation coils 34B, 34F, 34J, and 34N which the second coils face, respectively.

The second coils 36B, 36D, 36F, 36H, 36J, 36L, 36N, and 36P are disposed facing each other to form one pair at a rotation angle of 180° to the rotation center of the resolver rotor 31. The polarity of the second coils 36B, 36D, 36F, 36H, 36J, 36L, 36N, and 36P becomes the same as the polarity excited by the excitation coils 34B, 34D, 34F, 34H, 34J, 34L, 34N, and 34P which the second coils face, respectively.

When an alternating current is applied to each of the excitation coils 33A to 33R, the first coils 35A, 35C, 35E, 35G, 35I, 35K, 35M, and 35O output a waveform represented by sin 20θ, for example and the second coils 36B, 36D, 36F, 36H, 36J, 36L, 36N, and 36P output a waveform in which the phase shifts from that of the first coils 35A, 35C, 35E, 35G, 35I, 35K, 35M, and 35O, e.g., a waveform represented by cos 20θ. The "θ" refers to the rotation angle of the resolver rotor 31. The output is one in which an amplitude component is omitted.

Figure 4:
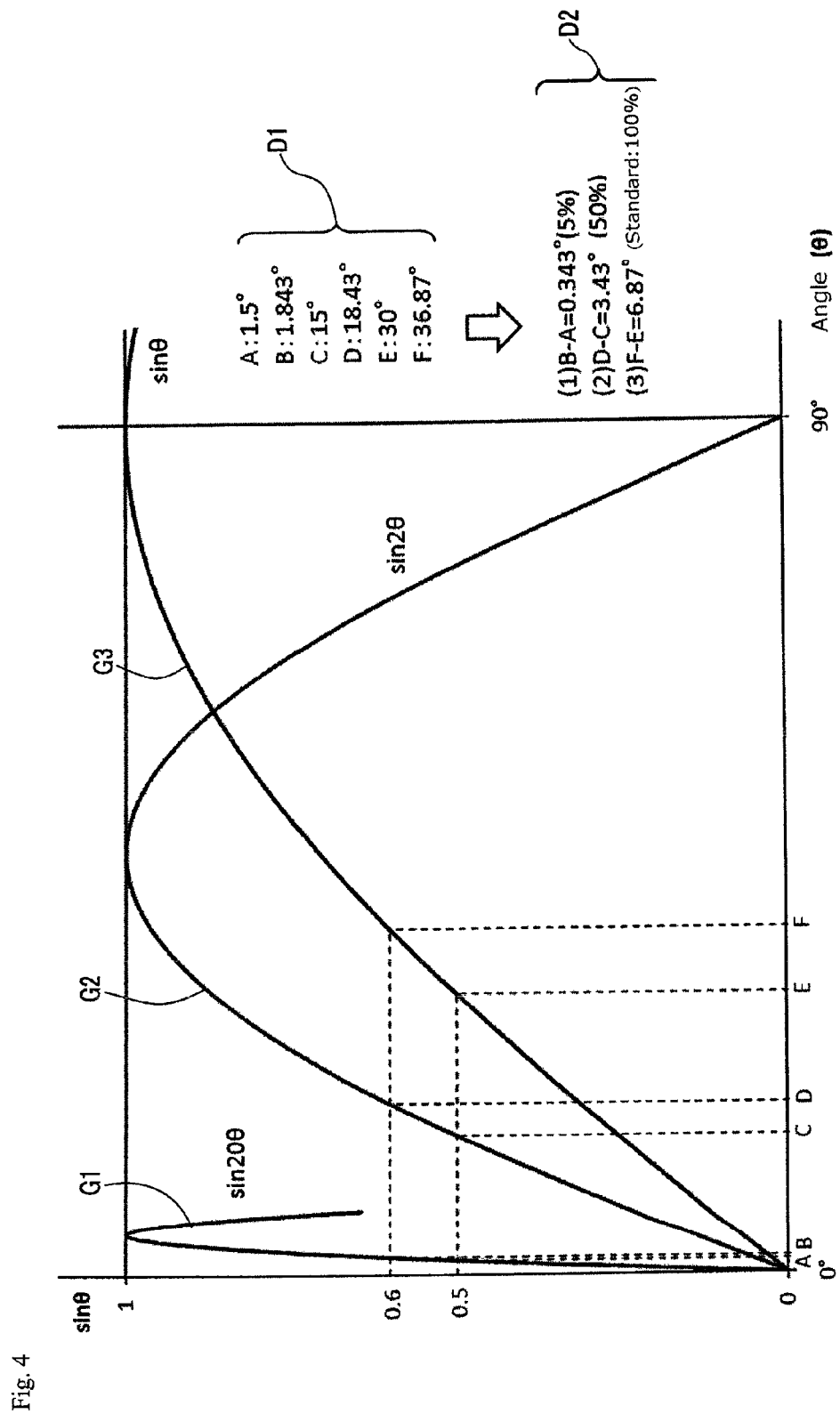
FIG. 4 illustrates a graph illustrating the output waveform of the resolver stator 32 with the output waveforms of resolver stators of "2X" and "1X" types.

The waveforms output from the first coils 35A, 35C, 35E, 35G, 35I, 35K, 35M, and 35O and the second coils 36B, 36D, 36F, 36H, 36J, 36L, 36N, and 36P are processed by an external signal-processing circuit. G1 in the graph of FIG. 4 represents changes in the output of the first coils 35A, 35C, 35E, 35G, 35I, 35K, 35M, and 35O. Herein, the horizontal axis of the graph represents the rotation angle θ of the resolver rotor 31 and the vertical axis represents the output. In the graph, G2 and G3 are shown as comparison of G1. G2 represents changes in the output of a VR resolver having a shaft-multiple angle number of 2, i.e., a "2X" type. G3 represents changes in the output a VR resolver having a shaft-multiple angle number of 1, i.e., a "1X" type. Hereinafter, the rotation amounts of the resolver rotor for changing the outputs of G1, G2, and G3 from 0.5 to 0.6 are compared.

In G1, the range of the horizontal axis corresponding to the range of 0.5 to 0.6 of the vertical axis is represented by A to B. Herein, A=1.5° and B=1.843° are established (see D1). More specifically, in G1, when the angle of the resolver rotor changes by 0.343° from A to B, the output changes from 0.5 to 0.6. In G2, the range of the horizontal axis corresponding to the range of 0.5 to 0.6 of the vertical axis is represented by C to D. Herein, C=15° and D=18.43° are established (see D1). More specifically, in G2, when the angle of the resolver rotor changes by 3.43° from C to D, the output changes from 0.5 to 0.6. In G3, the range of the horizontal axis corresponding to the range of 0.5 to 0.6 of the vertical axis is represented by E to F. Herein, E=30° and D=36.87° are established (see D1). More specifically, in G3, when the angle of the resolver rotor changes by 6.87° from E to F, the output changes from 0.5 to 0.6.

As described above, in G1, G2, and G3, the changes in the angle corresponding to the changes in the outputs from 0.5 to 0.6 are 0.343°, 3.43°, and 6.87°, respectively. With respect to the angle ratio, when G3 is 100%, G1 is 5% and G2 is 50% (see D2). More specifically, supposing that the minimum value of the changes in the outputs which can be detected by a signal-processing circuit is constant, the VR resolver of G2 can detect an angle change of the half of the minimum angle change which can be detected by the VR resolver of G3. The VR resolver 30 of G1 according to this embodiment can detect an angle change of 1/20 of the minimum angle change which can be detected by the VR resolver of G3.

In the VR resolver 30 according to this embodiment, "20X" is realized with a limited number of stator slots and detection accuracy higher than that of a former VR resolver can be obtained.

Since both the first coils 35A, 35C, 35E, 35G, 35I, 35K, 35M, and 35O and the second coils 36B, 36D, 36F, 36H, 36J, 36L, 36N, and 36P are not wound around one stator slot, the outer diameters of all the first coils and second coils can be made equal. Therefore, the first coils 35A, 35C, 35E, 35G, 35I, 35K, 35M, and 35O and the second coils 36B, 36D, 36F, 36H, 36J, 36L, 36N, and 36P are in an electrically and mechanically balanced state. Thus, the detection accuracy of the rotation angle further improves.

Around all the teeth 33A to 33P disposed in an annular shape, either the first coils 35A, 35C, 35E, 35G, 35I, 35K, 35M, and 35O or the second coils 36B, 36D, 36F, 36H, 36J, 36L, 36N, and 36P are wound. Therefore, even when the magnetic property of the resolver stator 32 or the resolver rotor 31 has a little directivity, the output from each of the coils wound around the teeth 33A to 33P of the entire circumference are integrated, and the electrical error is averaged.

The polarity of one pair disposed facing each other to the rotation center of the resolver rotor 31 among the first coils 35A, 35C, 35E, 35G, 35I, 35K, 35M, and 35O becomes the same as the polarity excited by the excitation coils 34A, 34C, 34E, 34G, 34I, 34K, 34M, and 34O which the first coils face, respectively. Even when the rotation center of the resolver rotor 31 decenters from the center of the resolver stator 32 to be close to one of one pair of the first coils disposed facing each other to the rotation center of the resolver rotor 31 among the first coils 35A, 35C, 35E, 35G, 35I, 35K, 35M, and 35O and to be away from the other one of the pair, a fluctuation in a voltage occurring due to the decentering in the one pair of the first coils 35A, 35C, 35E, 35G, 35I, 35K, 35M, and 35O disposed facing each other occurs in such a manner that when the voltage of one first coil of the pair increases, the voltage of the other first coil of the pair decreases. More specifically, the fluctuation in the voltage occurring due to the decentering of the resolver rotor 31 in the first coils 35A, 35C, 35E, 35G, 35I, 35K, 35M, and 35O is canceled in one pair of the first coils facing each other.

The polarity of one pair disposed facing each other to the rotation center of the resolver rotor 31 among the second coils 36B, 36D, 36F, 36H, 36J, 36L, 36N, and 36P becomes the same as the polarity excited by the excitation coils 34B, 34D, 34F, 34H, 34J, 34L, 34N, and 34P which the first coils face, respectively. Even when the rotation center of the resolver rotor 31 decenters from the center of the resolver stator 32 to be close to one of one pair of the second coils disposed facing each other to the rotation center of the resolver rotor 31 among the second coils 36B, 36D, 36F, 36H, 36J, 36L, 36N, and 36P and to be away from the other one of the pair, a fluctuation in a voltage occurring due to the decentering in the one pair of the second coils 36B, 36D, 36F, 36H, 36J, 36L, 36N, and 36P disposed facing each other occurs in such a manner that when the voltage of one first coil of the pair increases, the voltage of the other second coil of the pair decreases. More specifically, the fluctuation in the voltage occurring due to the decentering of the resolver rotor 31 in the second coils 36B, 36D, 36F, 36H, 36J, 36L, 36N, and 36P is canceled in one pair of the second coils facing each other.

Second Embodiment

A second embodiment of the invention is described below. As described above, the number of teeth is determined by the product of an integer P of 2 or more and 4. The number of the convex portions of the resolver rotor is determined by the product of an odd number m of 3 or more and the integer P.

Although the first embodiment describes the example of P=4 and m=5, the second embodiment describes an example of P=3 and m=5.

Figure 5:
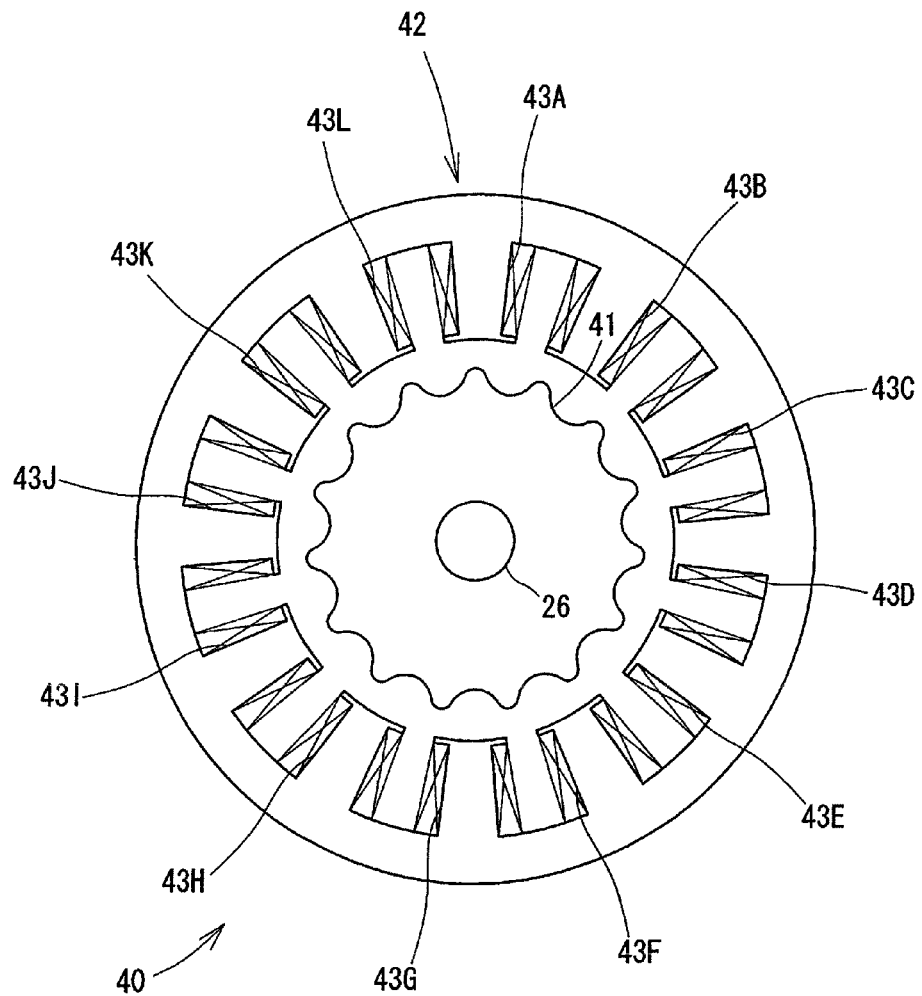
FIG. 5 is a schematic view illustrating the configuration of a VR resolver 40 according to a second embodiment.

As illustrated in FIG. 5, a VR resolver 40 is constituted by a resolver stator 42 in which 12 teeth 43A to 43L in total are projected and a resolver rotor 41 in which 15 convex portions are radially projected as viewed in plan. For the integer P and the odd number m, different values may be used. For example, in the case of m=3, the number of the convex portions of the resolver rotor 41 is 9. Preferably, the range of the values of the integer P is 2 to 6 and the value of the odd number m is 3 or 5.

In an aspect in which the VR resolver 40 is mounted on a rotary drive unit or the like, the resolver rotor 41 is fixed to the shaft 26 of the rotary drive unit. The resolver rotor 41 is rotated to the resolver stator 42 while being integrated with the shaft 26. The cross sectional view of the resolver rotor 41 is the same as that illustrated in FIG. 2.

The resolver stator 42 has an approximately cylindrical shape. The 12 teeth 43A to 43L are projected from the inner circumferential surface to the inner side in the diameter direction of the resolver stator 42. The 12 teeth 43A to 43L are arranged in an annular shape. Spaces formed by the adjacent teeth 43A to 43L at the inner circumferential surface of the resolver stator 42 are stator slots. The resolver stator 42 is obtained by press processing of a nondirectional electrical steel plate of a given thickness into a shape as viewed in plane illustrated in FIG. 5, and laminating a plurality of the steel plates and fixing the same by crimping or the like, for example. The resolver rotor 41 is disposed inside the teeth 43A to 43L of the resolver stator 42. The resolver rotor 41 is obtained by laminating a plurality of nondirectional electrical steel plates having a shape in which 15 convex portions are radially projected as viewed in plan, and fixing the same by crimping or the like. The gap permeance of the resolver rotor 41 and the resolver stator 42 changes in the shape of a sine wave to the angle θ of the rotation angle of the resolver rotor 41. The shaft-multiple angle number n is equal to the number of the convex portions formed in the resolver rotor 41. In the resolver rotor 41 in this embodiment, the angle θ required for 1 cycle of a sine wave is 360/15=24°. More specifically, the resolver is a "15X" type in which when the resolver rotor 41 makes one rotation, a 15 cycle sine wave is output.

Figure 6:
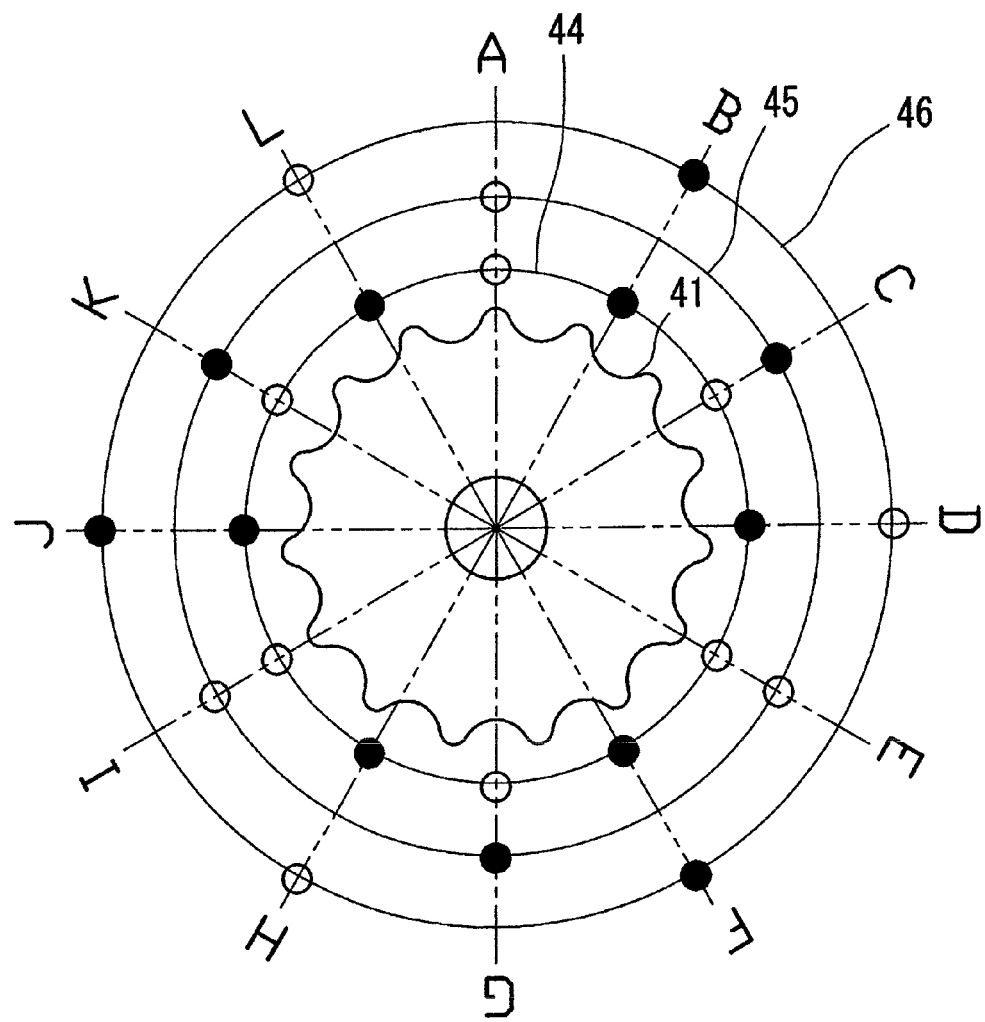
FIG. 6 is a schematic view illustrating a coil in a resolver stator 42.

In FIG. 6, the position of each of the teeth 43A to 43L of the resolver stator 42 is illustrated only by alphabets A to L. Excitation coils 44A to 44L are illustrated on the line illustrating the innermost circle. First coils 45A, 45C, 45E, 45G, 45I, and 45K are illustrated on the line illustrating the center circle. Second coils 46B, 46D, 46F, 46H, 46J, and 46L are illustrated on the line illustrating the outermost circle. As illustrated in FIG. 6, around the teeth 43A to 43L of the resolver stator 42, the excitation coils 44A to 44L, the first coils 45A, 45C, 45E, 45G, 45I, and 45K, and the second coils 46B, 46D, 46F, 46H, 46J, and 46L are wound in a given winding direction. The number of turns of each of the first coils 45A, 45C, 45E, 45G, 45I, and 45K is almost the same and the number of turns of each of the second coil 46B, 46D, 46F, 46H, 46J, and 46L is almost the same.

For the winding of the excitation coils 44A to 44L, the first coils 45A, 45C, 45E, 45G, 45I, and 45K, and the second coils 46B, 46D, 46F, 46H, 46J, and 46L, a flyer type winder or a nozzle type winder is used, for example.

The excitation coils 44A to 44L are wound around the teeth 43A to 43L, respectively. When a current is applied to the excitation coils 44A to 44L, a magnetic field of positive polarity or negative polarity is formed in each of the excitation coils 44A to 44L. When an alternating current is applied to the excitation coils 44A to 44L, the polarity in each of the excitation coils 44A to 44L changes at a given frequency. Around the teeth 43A, 43C, 43E, 43G, 43I, and 43K, the excitation coils of positive polarity 44A, 44C, 44E, 44G, 44I, and 44K are wound, respectively. Around the teeth 43B, 43D, 43F, 43H, 43J, and 43L, the excitation coils of negative polarity 44B, 44D, 44F, 44H, 44J, and 44L are wound, respectively. In FIG. 6, although the coil which becomes positive polarity is illustrated by "○" and the coil which becomes negative polarity is illustrated by "●", it is in a relative relationship whether or not the polarity of positive or negative. Therefore, it is a matter of course that the polarity may be reversed. Thus, when the excitation coils 44A, 44C, 44E, 44G, 44I, and 44K excite either positive polarity or negative polarity, the excitation coils 44B, 44D, 44F, 44H, 44J, and 44L excite the other one of positive polarity or negative polarity.

The excitation coils 44A to 44L are disposed facing each other in such a manner as to form one pair at a rotation angle of 180° to the rotation center of the resolver rotor 41. In these excitation coils 44A to 44L, the polarity of a pair of the coils disposed facing each other is the same.

The first coils 45A, 45C, 45E, 45G, 45I, and 45K are wound around the teeth 43A, 43C, 43E, 43G, 43I, and 43K, respectively. In response to the magnetic field of the excitation coils 44A to 44L, an induced voltage arises in each of the first coils 45A, 45C, 45E, 45G, 45I, and 45K. Around the teeth 43A, 43E, and 43I, the first coils 45A, 45E, and 45I, are wound with positive polarity, respectively. Around the teeth 43C, 43G, and 43K, the first coils 45C, 45G, and 45K are wound with negative polarity, respectively. Thus, the polarity of the first coils 43C, 43G, and 43K becomes the same as the polarity excited by the excitation coils 44C, 44G, and 44K which the first coils face, respectively. The polarity of the first coils 45A, 45E, and 45I becomes opposite to the polarity excited by the excitation coils 44A, 44E, and 44I which the first coils face, respectively.

The first coils 45A, 45C, 45E, 45G, 45I, and 45K are disposed facing each other in such a manner as to form one pair at a rotation angle of 180° to the rotation center of the resolver rotor 41. The polarity of each pair of the first coils 45A, 45C, 45E, 45G, 45I, and 45K is the same as the polarity of the excitation coils 44A, 44C, 44E, 44G, 44I, and 44K which the first coils face, respectively.

The second coils 46B, 46D, 46F, 46H, 46J, and 46L are wound around the teeth 43B, 43D, 43F, 43H, 43J, and 43L, respectively. In response to the magnetic field of the excitation coils 44A to 44L, an induced voltage arises in each of the second coils 46B, 46D, 46F, 46H, 46J, and 46L. Around the teeth 43D, 43H, and 43L, the second coils 46D, 46H, and 46L are wound with positive polarity, respectively. Around the teeth 43B, 43F, and 43J, the second coils 46B, 46F, and 46J are wound with negative polarity, respectively. Thus, the polarity of the second coils 46D, 46H, and 46L becomes the same as the polarity excited by the excitation coils 44D, 44H, and 44L which the second coils face, respectively. The polarity of the second coils 46B, 46F, and 46J becomes opposite to the polarity excited by the excitation coils 44B, 44F, and 44J which the second coils face, respectively.

The second coils 46B, 46D, 46F, 46H, 46J, and 46L are disposed facing each other to form one pair at a rotation angle of 180° to the rotation center of the resolver rotor 41. The polarity of each pair of the second coils 46B, 46D, 46F, 46H, 46J, and 46L becomes the same as the polarity excited by the excitation coils 44B, 44D, 44F, 44H, 44J, and 44L which the second coils face, respectively.

Also in the VR resolver 40 according to this embodiment, the same effects as those of the VR resolver 30 according to the first embodiment are demonstrated. In particular, since "15X" is realized with a limited number of stator slots, detection accuracy higher than that of a former VR resolver can be obtained.

Third Embodiment

A third embodiment of the invention is described below. As described above, the number of teeth is determined by the product of an integer P of 2 or more and 4. The number of the convex portions of the resolver rotor is determined by the product of an odd number m of 3 or more and the integer P. Although the first embodiment describes the example of P=4 and m=5, the third embodiment describes an example of P=2 and m=5.

Figure 7:
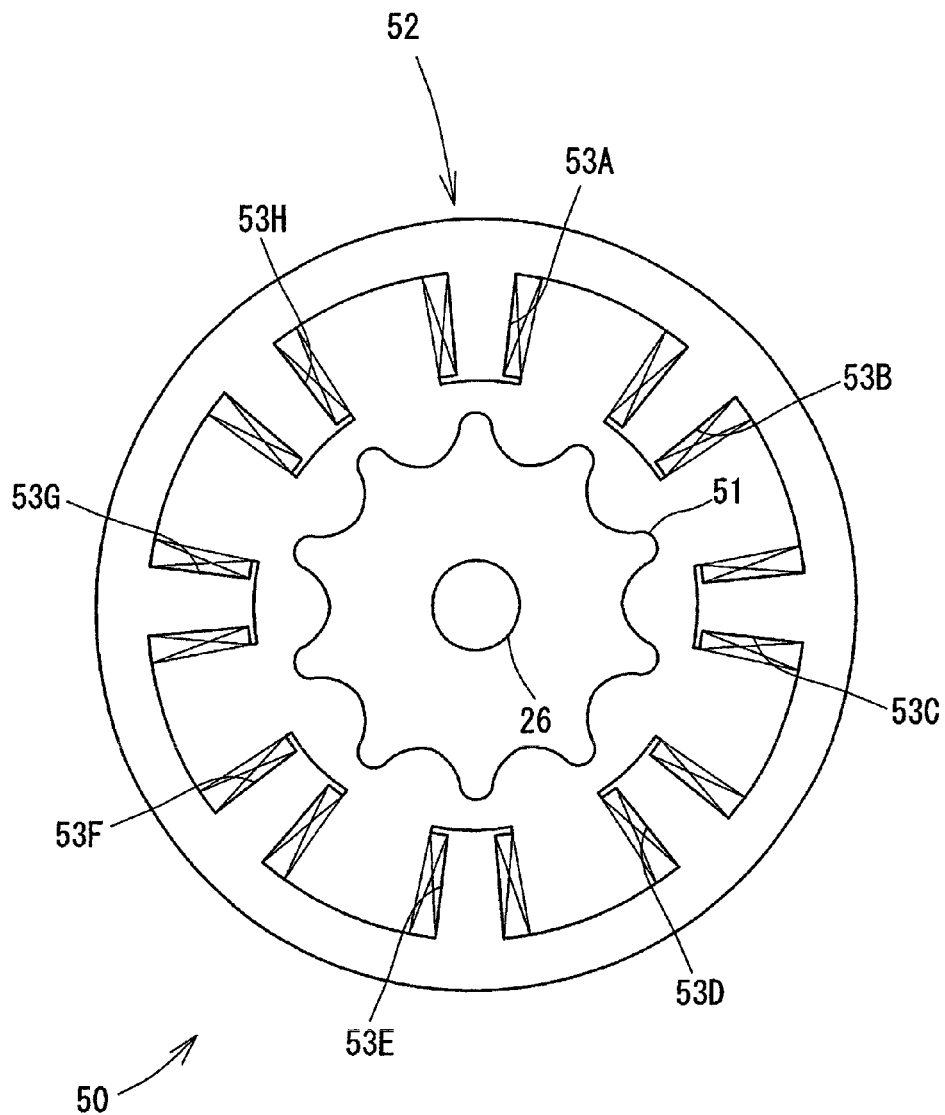
FIG. 7 is a schematic view illustrating the configuration of a VR resolver 50 according to a third embodiment.

As illustrated in FIG. 7, a VR resolver 50 is constituted by a resolver stator 52 in which 8 teeth 53A to 53H in total are projected and a resolver rotor 51 in which 10 convex portions are radially projected as viewed in plan. For the integer P and the odd number m, different values may be used. For example, in the case of m=3, the number of the convex portions of the resolver rotor 51 is 6. Preferably, the range of the values of the integer P is 2 to 6 and the value of the odd number m is 3 or 5.

When the VR resolver 50 is mounted on a rotary drive unit or the like, the resolver rotor 51 is fixed to the shaft 26 of the rotary drive unit. The resolver rotor 51 is rotated to the resolver stator 52 while being integrated with the shaft 26. The cross sectional view of the resolver rotor 51 is the same as that illustrated in FIG. 2.

The resolver stator 52 has an approximately cylindrical shape. The 8 teeth 53A to 53H are projected from the inner circumferential surface to the inner side in the diameter direction of the resolver stator 52. The 8 teeth 53A to 53H are arranged in an annular shape. Spaces formed by the adjacent teeth 53A to 53H at the inner circumferential surface of the resolver stator 52 are stator slots. The resolver stator 52 is obtained by press processing of a nondirectional electrical steel plate of a given thickness into a shape as viewed in plane illustrated in FIG. 7, and laminating a plurality of the steel plates and fixing the same by crimping or the like, for example. The resolver rotor 51 is disposed inside the teeth 53A to 53H of the resolver stator 52. The resolver rotor 51 is obtained by laminating a plurality of nondirectional electrical steel plates having a shape in which 10 convex portions are radially projected as viewed in plan, and fixing the same by crimping or the like. The gap permeance of the resolver rotor 51 and the resolver stator 52 changes in the shape of a sine wave to the angle q of the rotation angle of the resolver rotor 51. The shaft-multiple angle number n is equal to the number of the convex portions formed in the resolver rotor 51. In the resolver rotor 51 in this embodiment, the angle θ required for 1 cycle of a sine wave is 360/10=36°. More specifically, the resolver is a "10X" type in which when the resolver rotor 51 makes one rotation, a 10 cycle sine wave is output.

Figure 8:
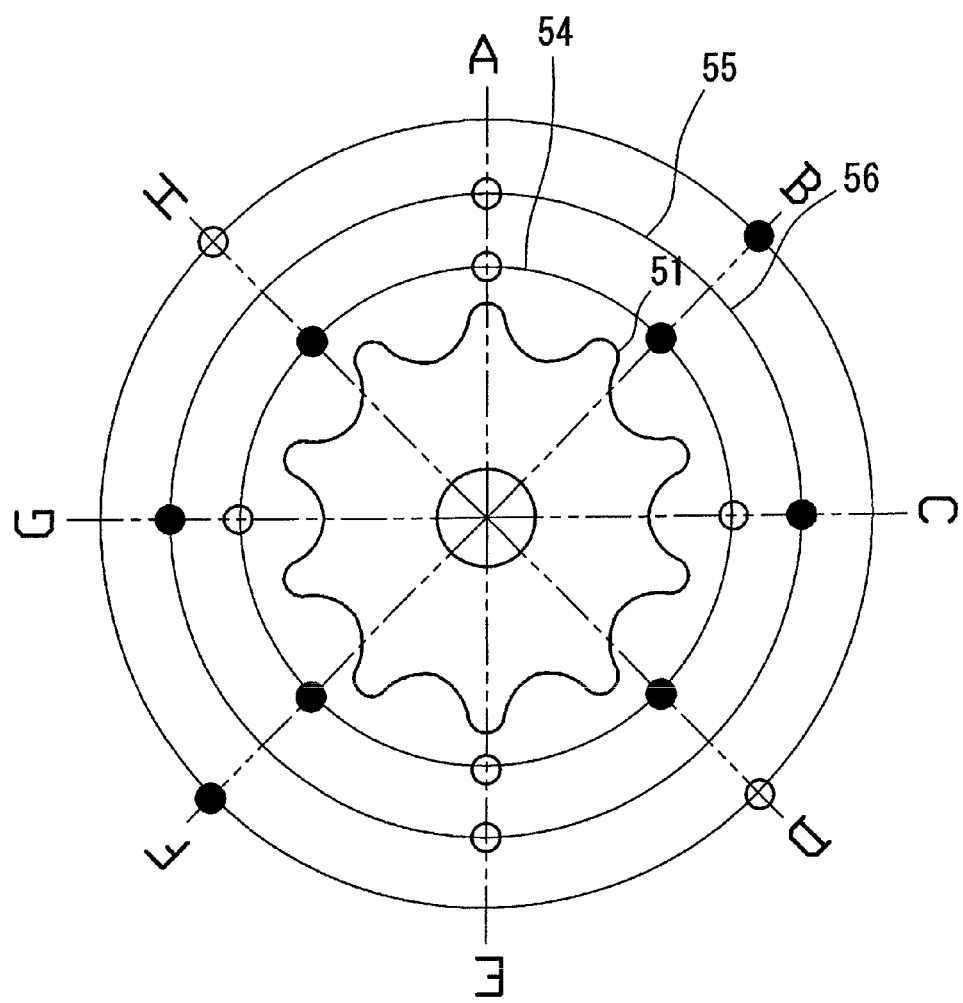
FIG. 8 is a schematic view illustrating a coil in a resolver stator 52.

In FIG. 8, the excitation coils 54A to 54H are illustrated on the line illustrating the innermost circle. The first coils 55A, 55C, 55E, and 55G are illustrated on the line illustrating the center circle. The second coils 56B, 56D, 56F, and 56H are illustrated on the line illustrating the outermost circle. Around the teeth 53A to 53H of the resolver stator 52, the excitation coils 54A to 54H, the first coils 55A, 55C, 55E, and 55G, and the second coils 56B, 56D, 56F, and 56H are wound in a given winding direction. The number of turns of each of the first coils 55A, 55C, 55E, and 55G is almost the same and the number of turns of each of the second coil 56B, 56D, 56F, and 56H is almost the same.

For the winding of the excitation coils 54A to 54H, the first coils 55A, 55C, 55E, and 55G, and the second coils 56B, 56D, 56F, and 56H, a flyer type winder or a nozzle type winder is used, for example. In FIG. 8, the position of each of the teeth 53A to 53H of the resolver stator 52 is illustrated by only alphabets A to H.

The excitation coils 54A to 54H are wound around the teeth 53A to 53H, respectively. When a current is applied to the excitation coils 54A to 54H, a magnetic field of positive polarity or negative polarity is formed in each of the excitation coils 54A to 54H. When an alternating current is applied to the excitation coils 54A to 54H, the polarity in each of the excitation coils 54A to 54H changes at a given frequency. Around the teeth 53A, 53C, 53E, and 53G, the excitation coils of positive polarity 54A, 54C, 54E, and 54G are wound, respectively. Around the teeth 53B, 53D, 53F, and 53H, the excitation coils of negative polarity 54B, 54D, 54F, and 54H are wound, respectively. In FIG. 8, although the coil which becomes positive polarity is illustrated by "○" and the coil which becomes negative polarity is illustrated by "●", it is in a relative relationship whether the polarity is positive or negative. Therefore, it is a matter of course that the polarity may be reversed. Thus, when the excitation coils 54A, 54C, 54E, and 54G excite either positive polarity or negative polarity, the excitation coils 54B, 54D, 54F, and 54H excite the other one of positive polarity or negative polarity.

The excitation coils 54A to 54H are disposed facing each other in such a manner as to form one pair at a rotation angle of 180° to the rotation center of the resolver rotor 51. In these excitation coils 54A to 54H, the polarity of a pair of the coils disposed facing each other is the same.

The first coils 55A, 55C, 55E, and 55G are wound around the teeth 53A, 53C, 53E, and 53G, respectively. In response to the magnetic field of the excitation coils 54A to 54H, each of the first coils 55A, 55C, 55E, and 55G generates an induced voltage. Around the teeth 53A and 53E, the first coils 55A and 55E are wound with positive polarity, respectively. The first coils 55C and 55G are wound with negative polarity around the teeth 53C and 53G. Thus, the polarity of the first coils 53C and 53G becomes the same as the polarity excited by the excitation coils 54C and 54G which the first coils face, respectively. The polarity of the first coils 55A and 55E becomes opposite to the polarity excited by the excitation coils 54A and 54E which the first coils face, respectively.

The first coils 55A, 55C, 55E, and 55G are disposed facing each other in such a manner as to form one pair at a rotation angle of 180° to the rotation center of the resolver rotor 51. The polarity of each pair of the first coils 55A, 55C, 55E, and 55G is the same as the polarity of the excitation coils 54A, 54C, 54E, and 54G which the first coils face, respectively.

The second coils 56B, 56D, 56F, and 56H are wound around the teeth 53B, 53D, 53F, and 53H, respectively. In response to the magnetic field of the excitation coils 54A to 54H, an induced voltage arises in each of the second coils 56B, 56D, 56F, and 56H. Around the teeth 53D and 53H, the second coils 56D and 56H are wound with positive polarity, respectively. The second coils 56B and 56F are wound with negative polarity around the teeth 53B and 53F. Thus, the polarity of the second coils 56D and 56H becomes the same as the polarity excited by the excitation coils 54D and 54H which the second coils face, respectively. The polarity of the second coils 56B and 56F becomes opposite to the polarity excited by the excitation coils 54B and 54F which the second coils face, respectively.

The second coils 56B, 56D, 56F, and 56H are disposed facing each other to form one pair at a rotation angle of 180° to the rotation center of the resolver rotor 51. The polarity of each pair of the second coils 56B, 56D, 56F, and 56H becomes the same as the polarity excited by the excitation coils 54B, 54D, 54F, and 54H which the second coils face, respectively.

Also in the VR resolver 50 according to this embodiment, the same effects as those of the VR resolver 30 according to the first embodiment are demonstrated. In particular, since "10X" is realized with a limited number of stator slots, detection accuracy higher than that of a former VR resolver can be obtained.

The invention claimed is:

1. A variable reluctance resolver of a single-phase input and two-phase output type, comprising:

an annular stator in which stator slots whose number is equal to the product of an integer P of 2 or more and 4 are formed at regular intervals along a circumferential direction;

excitation coils which are provided in all the stator slots and generate a magnetic field by the application of a voltage;

first output coils which are selectively provided in the stator slots and output an electric signal of a first waveform based on the magnetic field;

second output coils which are provided in the stator slots in which the first output coils are not provided among the stator slots and output an electric signal of a second waveform based on the magnetic field; and a rotor in which convex portions whose number is equal to the product of an odd number m of 3 or more and the integer P are provided along the circumferential direction and which rotates inside the stator; and wherein the first output coils and the second output coils are alternately disposed in the stator slots adjacent to each other in the circumferential direction;

wherein the two adjacent first output coils are mutually wound in an opposite direction as viewed from the center of the stator, and wherein the two adjacent second output coils are mutually wound in an opposite direction as viewed from the center of the stator.

2. The variable reluctance resolver according to claim 1, wherein the integer P is 4 or lower and the odd number m is 5 or lower.

3. The variable reluctance resolver according to claim 1, wherein the number of turns of the first output coils and the number of turns of the second output coils are all equal.

4. The variable reluctance resolver according to claim 1, wherein the excitation coils are mutually wound in the same direction as viewed from the center of the stator in a pair of the stator slots symmetrical at 180.degree. with respect to the center of the stator.

5. The variable reluctance resolver according to claim 1, wherein the excitation coils are mutually wound in an opposite direction as viewed from the center of the stator in the two adjacent stator slots.

* * * * *